United States Patent
Nishiyama

(10) Patent No.: US 11,095,789 B2
(45) Date of Patent: Aug. 17, 2021

(54) IMAGE READING APPARATUS AND METHOD FOR CONTROLLING AN IMAGE READING APPARATUS

(71) Applicant: CANON KABUSHIKI KAISHA, Tokyo (JP)

(72) Inventor: Masashi Nishiyama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/536,111

(22) Filed: Aug. 8, 2019

(65) Prior Publication Data
US 2020/0076975 A1    Mar. 5, 2020

(30) Foreign Application Priority Data
Aug. 31, 2018   (JP) .............................. JP2018-162254

(51) Int. Cl.
*G06F 3/12* (2006.01)
*H04N 1/00* (2006.01)

(52) U.S. Cl.
CPC ..... *H04N 1/00779* (2013.01); *H04N 1/00474* (2013.01); *H04N 1/00477* (2013.01); *H04N 1/00708* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2007/0212098 A1* | 9/2007 | Hoshino | ............ | G03G 15/5016 399/81 |
| 2010/0053697 A1* | 3/2010 | Kubota | .................... | H04N 1/56 358/449 |
| 2010/0107064 A1* | 4/2010 | Yamaguchi | ........... | G06F 40/106 715/274 |
| 2010/0214619 A1* | 8/2010 | Sudo | .................... | H04N 1/3875 358/3.24 |
| 2011/0279360 A1* | 11/2011 | Kimura | .............. | H04N 1/00448 345/156 |
| 2016/0014290 A1* | 1/2016 | Mizuno | .............. | H04N 1/00779 358/1.2 |
| 2016/0070219 A1* | 3/2016 | Ono | ..................... | G03G 15/607 399/86 |

(Continued)

FOREIGN PATENT DOCUMENTS

JP    2001-350225 A    12/2001
JP    2010-056803 A    3/2010

*Primary Examiner* — Henok Shiferaw
(74) *Attorney, Agent, or Firm* — Canon U.S.A., Inc. IP Division

(57) ABSTRACT

A multifunction peripheral (MFP), which successively conveys a plurality of documents stacked on a document tray and reads the document, determines whether there is a difference among sizes of the plurality of documents in response to at least one of the documents being read by a scanner, in a case where a preview operation of a read image is performed, notifies a user of a possibility that documents having different sizes are mixed and read based on a result of the determination, enables a function of performing reading corresponding to respective document size of mixed size documents in which documents having different sizes are mixed, and provides navigation for prompting re-reading of the document.

11 Claims, 11 Drawing Sheets

(56) References Cited

U.S. PATENT DOCUMENTS

| | | | |
|---|---|---|---|
| 2016/0170692 A1* | 6/2016 | Osada | H04N 1/2104 |
| | | | 358/1.15 |
| 2016/0205271 A1* | 7/2016 | Nakayoshi | H04N 1/00713 |
| | | | 358/1.12 |
| 2018/0095701 A1* | 4/2018 | Takahashi | G06F 9/451 |
| 2018/0146115 A1* | 5/2018 | Thompson | H04N 1/0044 |
| 2018/0160008 A1* | 6/2018 | Osada | H04N 1/00588 |

* cited by examiner

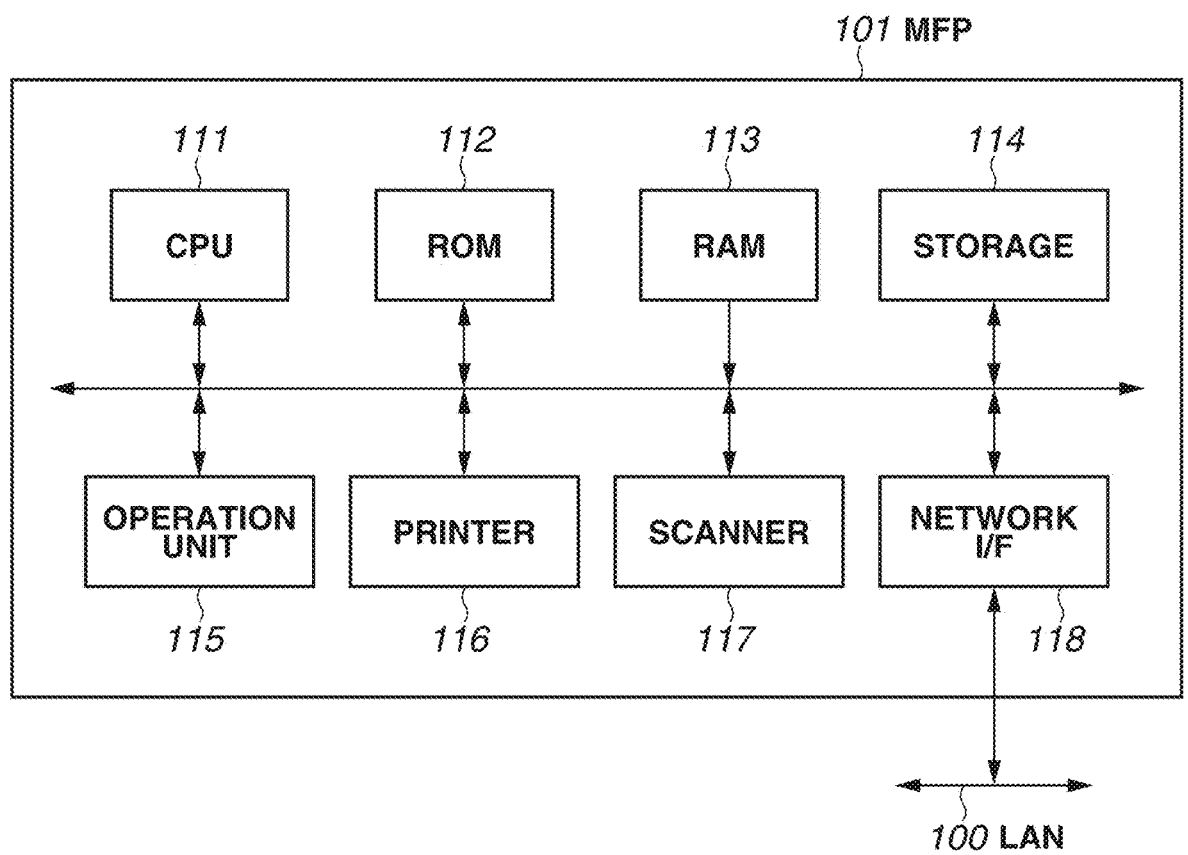

FIG.2A
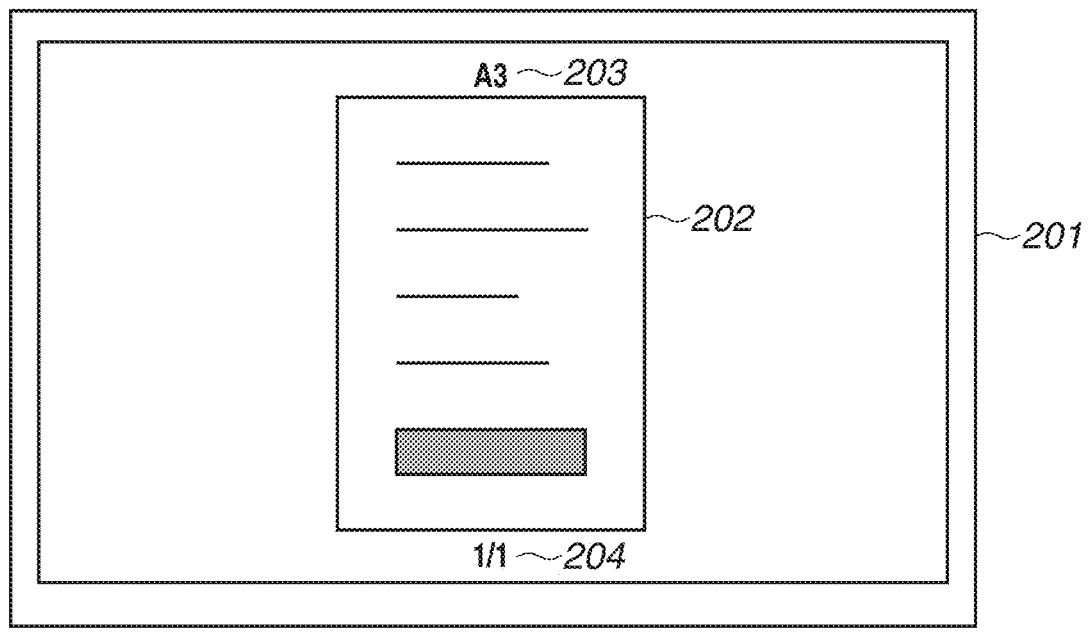
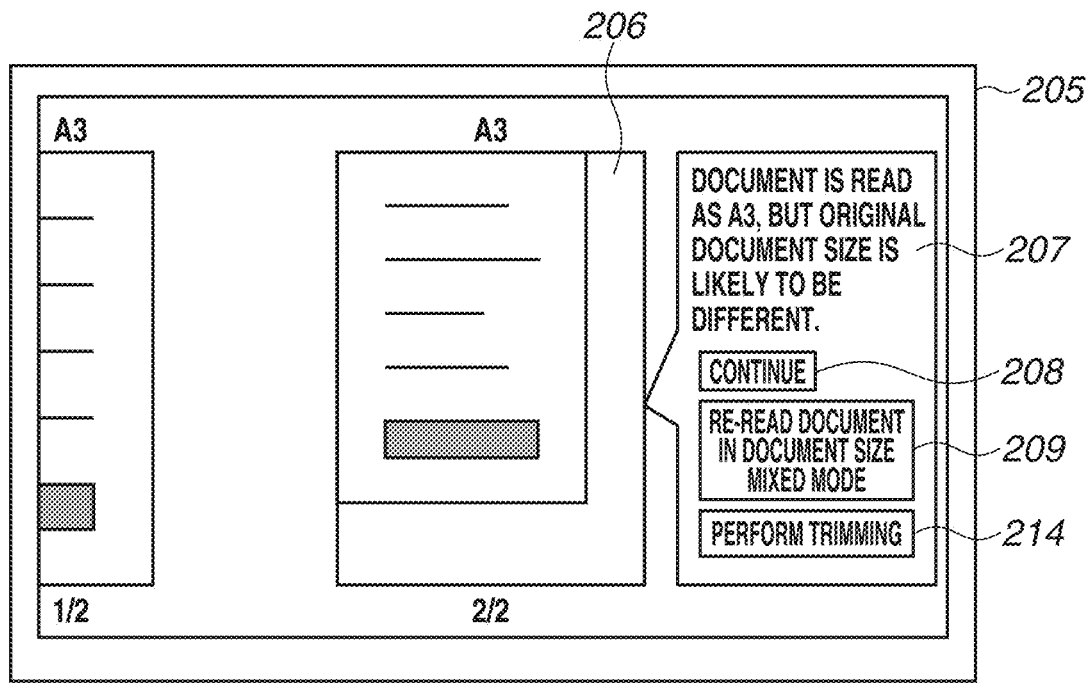

FIG.2B
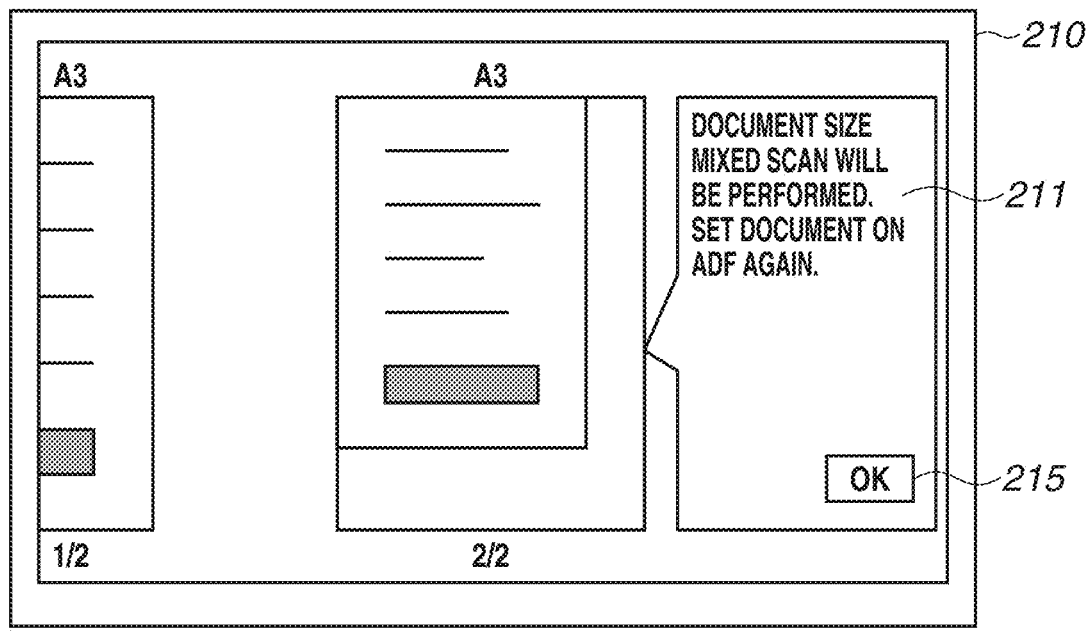
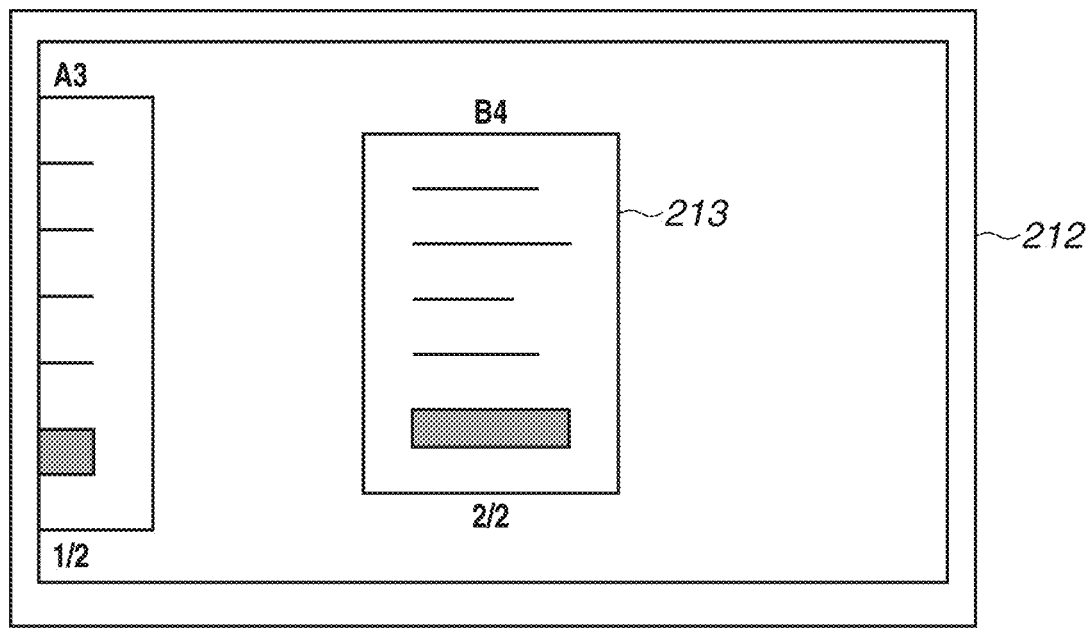

FIG.7
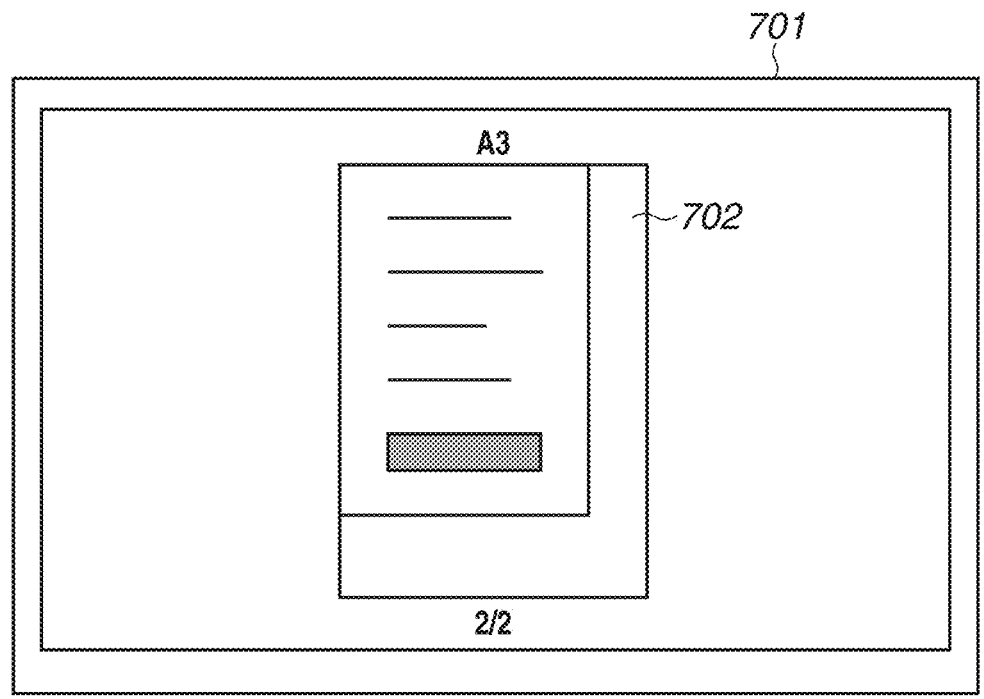
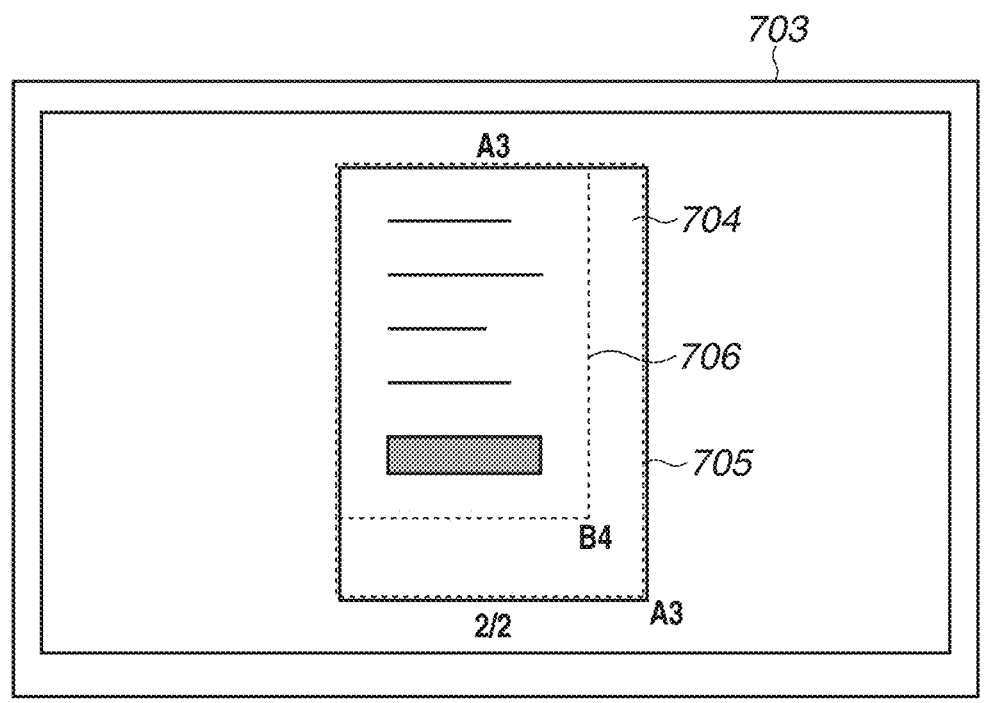

IMAGE READING APPARATUS AND METHOD FOR CONTROLLING AN IMAGE READING APPARATUS

BACKGROUND

Field

The present disclosure relates to a technique for controlling an image reading apparatus.

Description of the Related Art

In a case where an image reading apparatus such as a digital copying machine reads documents, there is a method for generating image data by reading the documents while conveying the documents one by one by automatic document feeders (ADF).

According to Japanese Patent Application Laid-Open No. 2010-056803, there is discussed an image reading apparatus that can display a preview screen of image data for confirming the image data obtained by reading a document.

According to Japanese Patent Application Laid-Open No. 2001-350225, there is discussed an image reading apparatus that has a document size mixed mode allowing conveyance and reading of documents having different sizes.

SUMMARY

The above-discussed related art has drawbacks. For example, if documents having different sizes are conveyed and read in a mode other than the document size mixed mode, a size of a part of image data will be different from a document size. If the image data is confirmed using the above-described preview in this state, a following state occurs.

In simple preview display of image data as described in Japanese Patent Application Laid-Open No. 2010-056803, it is difficult for a user to recognize that mixed size documents in which documents having different sizes are mixed are read, and a size of a part of image data is different from a size of the document. Even if a user can recognize the situation, a user who does not know existence of the document size mixed mode does not know that the user can reread the document by changing to the document size mixed mode as a recovery method. Accordingly, there is an issue that image data generated in a size different from a document size against user's expectation is output, for example, printed, stored, and transmitted.

In consideration of the above-discussed drawbacks of related art, the present disclosure discloses, among other things, a mechanism that enables a user to easily recognize that mixed size documents are read, and thus a size of a part of image data is different from a size of the document.

According to an aspect of the present disclosure, an image reading apparatus includes a display, at least one memory storing instructions, and at least one processor executing the instructions causing the image reading apparatus to successively convey a plurality of documents stacked on a document stacking tray and read the documents, determine, in response to at least one of the plurality of documents being read, whether there is a difference among respective sizes of the plurality of read documents, notify, in a case where a preview screen of an image corresponding to the read document is displayed on the display, a user of a possibility that documents having different sizes are mixed and read based on a result of the determination, enable a function of performing reading corresponding to respective size of the plurality of documents, and provide navigation for prompting re-reading of the plurality of documents based on the result of the determination.

Further features of the present disclosure will become apparent from the following description of exemplary embodiments with reference to the attached drawings.

BRIEF DESCRIPTION OF THE DRAWINGS

FIG. 1 is a block diagram illustrating an example of a hardware configuration of an image reading apparatus according to an exemplary embodiment.

FIGS. 2A and 2B illustrate examples of preview screens of the image reading apparatus according to the exemplary embodiment.

FIG. 7 illustrates an example of size guide display.

DESCRIPTION OF THE EMBODIMENTS

Exemplary embodiments according to the present disclosure will be described below with reference to the attached drawings.

FIG. 1 is a block diagram illustrating an example of a hardware configuration of an image reading apparatus according to an exemplary embodiment of the present disclosure.

In FIG. 1, a multifunction peripheral (MFP) 101 is an example of the image reading apparatus according to the present exemplary embodiment.

A central processing unit (CPU) 111 performs various types of control such as reading control and transmission control by reading a control program stored in a read-only memory (ROM) 112 or a storage 114 to a random access memory (RAM) 113 and executing the read control program.

The ROM 112 stores various programs and various data.

The RAM 113 is a main storage memory for the CPU 111 and is used as a temporary storage area for loading a control program stored in a work area and the storage 114.

The storage 114 stores image data, various programs, various pieces of history information, various pieces of setting information, and the like.

An operation unit 115 includes a liquid crystal display unit having a touch panel function and a keyboard and functions as a reception unit for receiving an instruction from a user and a display unit for displaying information for the user.

A printer 116 prints an image on a sheet based on image data.

Figure 9:
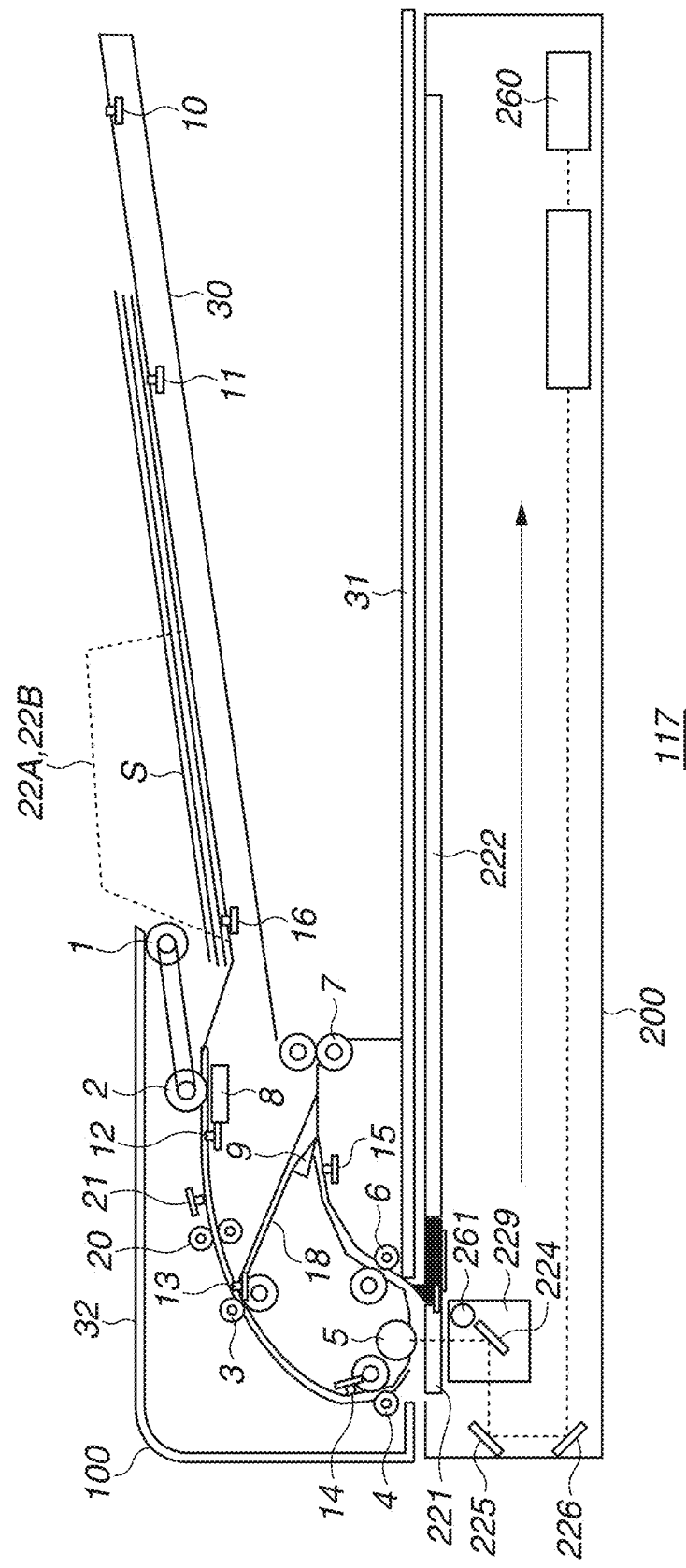
FIG. 9 is a cross-sectional view illustrating an example of a configuration of a scanner.

A scanner 117 includes an image reading unit (hereinbelow, referred to as "reader") 200 for reading an image on a document and an automatic document feeder (hereinbelow, referred to as "ADF") 100 as illustrated in FIG. 9 described below. The scanner 117 reads an image on a document set on the ADF or a document placed on a document positioning glass plate 222 and generates image data. A network interface (I/F) 118 is a unit for connecting with a network such as a LAN 100.

A configuration of the scanner 117 is described in detail below with reference to FIGS. 9 and 10.

FIG. 9 is a cross-sectional view illustrating an example of a configuration of the scanner 117 illustrated in FIG. 1.

Figure 10:
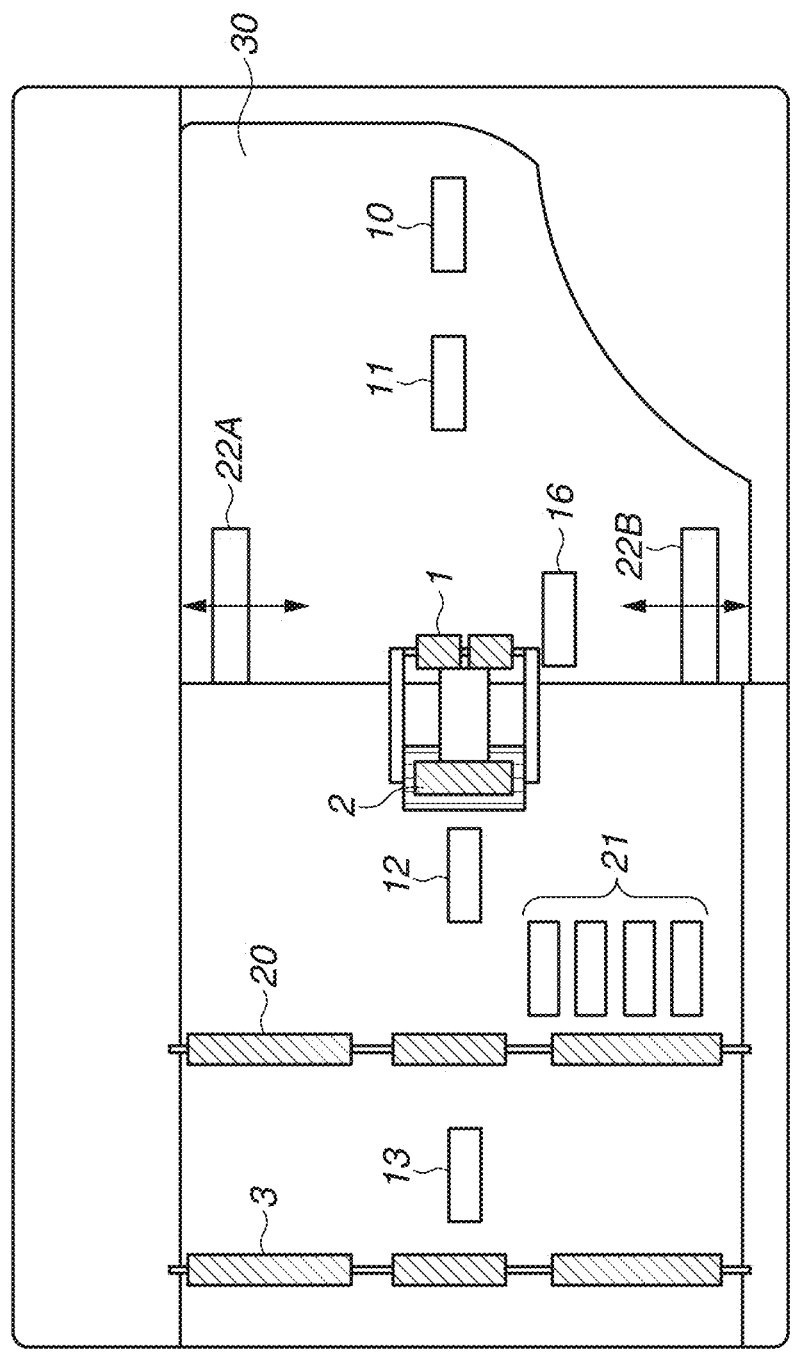
FIG. 10 is a plan perspective view of an automatic document feeder (ADF) viewed from above.

FIG. 10 is a plan perspective view of the ADF 100 viewed from the above.

The CPU 111 monitors an output of a document detection sensor 16 arranged in a document stacking tray (hereinbelow, referred to as "a document tray") 30 and determines whether a document bundle S is stacked on the document tray 30 based on the output of the document detection sensor 16.

In a case where a user inputs a document reading start instruction via the operation unit 115, the CPU 111 executes document reading processing by the scanner 117. If the document bundle S is stacked on the document tray 30 in a case where a user inputs the document reading start instruction, the CPU 111 reads the document by "flow reading". In "flow reading", a document in the document bundle S stacked on the document tray 30 is read by a reading unit 229 which is stopped at a predetermined position while being conveyed by the ADF 100.

A single-sided document reading operation (a single-sided flow reading operation) for reading a side of a document using the ADF 100 is described below. However, a double-sided document reading operation for reading both sides of the document may be performed.

The ADF 100 includes the document tray 30 as a document stacking tray on which the document bundle S including one or more document sheets is stacked, a separation pad 8 and a separation roller 2 for regulating the document bundle S not to protrude from the document tray 30 and move downstream before starting document conveyance, and a sheet feed roller 1.

The document tray 30 is provided with the document detection sensor 16 and thus can determine presence or absence of a document on the document tray 30. The document tray 30 is also provided with length sensors 10 and 11. The CPU 111 can detect a size of the document bundle S on the document tray 30 in a document conveyance direction (document length) based on detection results of the length sensors 10 and 11 and information stored in the ROM 112. Guide plates 22A and 22B, which can move in a direction perpendicular to the document conveyance direction, are provided on the document tray 30. An operator places the document bundle S on the document tray 30 and sets the guide plates 22A and 22B by adjusting to a width of the document bundle S (brings the guide plates 22A and 22B into contact with the stacked document bundle S). Both sides of the document bundle S along the document conveyance direction can be aligned in parallel to the conveyance direction by the guide plates 22A and 22B. A width between the guide plates 22A and 22B is detected by a sensor (hereinbelow, referred to as a "guide plate width sensor") which is not illustrated. The CPU 111 can detect a size of the document bundle S stacked on the document tray 30 in a direction perpendicular to the document conveyance direction (document width) based on a detection result of the above-described guide plate width sensor and information stored in the ROM 112 and the like.

An operation of "document size detection on the document tray" is described.

In the operation of "document size detection on the document tray", the document size detection is performed based on a combination of detection of the size in the document conveyance direction (document length) by the above-described length sensors 10 and 11 and detection of a size in a document main scanning direction (document width) by the guide plate width sensor. Accordingly, sizes of a plurality of documents can be detected in one set before conveyance of the documents. The "document size detection on the document tray" is executed, for example, in step S301 in FIG. 3 described below. In a document reading operation performed not in "the document size mixed mode", the CPU 111 performs control to read the document according to the document size obtained based on the above-described "document size detection on the document tray".

An ADF cover unit 32 holds the sheet feed roller 1 and the separation roller 2. The sheet feed roller 1 falls onto a document surface of the document bundle S stacked on the document tray 30 and rotates. With this operation, the document on top of the document bundle S is fed. The document fed by the sheet feed roller 1 is separated from the bundle S by an action of the separation roller 2 and the separation pad 8. The separation is implemented by a known separation technique. The above-described guide plates can regulate movement of the document in the direction perpendicular to the document conveyance direction at a time of document separation and reduce skewed conveyance of the document.

A conveyance roller 20 is arranged on a downstream side of the separation roller 2 in the document conveyance direction and conveys the document separated by the separation roller 2 and the separation pad 8. A registration roller 3 is a conveyance roller, which is arranged on the further downstream side of the conveyance roller 20, for conveying the document. The registration roller 3 corrects skew feeding of the document.

A sheet feeding path for conveying the document in a direction toward a flow reading glass 221 is arranged on the downstream side of the registration roller 3. The document conveyed to the sheet feeding path is conveyed to a flow reading position by a conveyance roller 4. The document passing between the flow reading glass 221 and a facing member 5 is irradiated with light by a light source 261. Reflected light from the document is deflected by a plurality of mirrors 224, 225, and 226, and an image of the document is read line by line by an image reading unit 260.

The document that has passed through the flow reading position is conveyed by a conveyance roller 6, proceeds while pushing up a flapper 9, and then is conveyed by a sheet discharge roller 7 to a sheet discharge tray 31.

In a case where a plurality of documents is stacked on the document tray 30, the ADF 100 repeats sheet feeding from the document bundle S, separation, conveyance processing, reading processing at the flow reading position, and sheet discharge processing described above until reading and discharging to the sheet discharge tray 31 of a last document is completed.

As described above, the scanner 117 reads documents by successively conveying a plurality of documents stacked on the document tray 30 of the ADF 100.

Various sheet sensors (12, 21, 13, 14, and 15) are arranged on a conveyance path of the document, and these sheet sensors detect each document conveyed by the ADF 100.

The sheet sensor 12 detects a leading edge and a trailing edge of the document. The CPU 111 can detect a length of a side of the document, i.e., a length of the document in a sub-scanning direction (document conveyance direction) for each sheet of the document based on a time difference between detection of the leading edge and detection of the trailing edge of the document by the sheet sensor 12 and a conveyance speed of the document during the conveyance by the ADF 100.

A width sensor 21 detects a width of the document separated and fed by the ADF 100. The width of the document represents a length of the document in the main scanning direction (direction perpendicular to the document conveyance direction). The width sensor 21 includes a plurality of sensors as illustrated in FIG. 10. The CPU 111 can detect the width of the document for each sheet of the document based on whether each of the sensors detects the document or not and information stored in the ROM 112 and the like. The sheet sensors 13, 14, and 15 detect the leading edge and the trailing edge of the document, and detection results of these sheet sensors are used for various control timings.

Now, an operation of "document size detection in the document size mixed mode" according to the present exemplary embodiment is described. In "the document size mixed mode" according to the present exemplary embodiment, the document size detection is performed based on a combination of detection of the size in the document conveyance direction (document length) by the above-described length sensors 10 and 11 and detection of the size in the document main scanning direction (document width) by the width sensor 21. As described above, the size in the document conveyance direction (document length) can be detected by the sheet sensor 12. However, a compact ADF, which has a relatively short document conveyance path to a document reading start position, cannot complete detection of the document length by the time when the document reaches the reading start position in some cases. Thus, in "the document size mixed mode" according to the present exemplary embodiment, the configuration is adopted in which the size in the document conveyance direction (document length) is detected using the length sensors 10 and 11. The "document size detection in the document size mixed mode" is executed, for example, in step S307 in FIG. 3 described below. In the document reading operation in "the document size mixed mode", the CPU 111 performs control to read the document in the document size determined based on the "document size detection in the document size mixed mode".

With this configuration, in a case where documents, which have a same document width but different document lengths such as an A3 document and an A4 document, are combined and loaded in a mixed state, the length sensors 10 and 11 detect the A4 document and the A3 document mixed with the A4 document in the document size mixed mode according to the present exemplary embodiment. Thus, the A4 document is determined as having a detected size of A3 and read as the A3 document. Therefore, a combination of document sizes in which documents can be mixed and loaded (document size mixed loading is permitted) and a combination of document sizes that cannot be mixed and loaded (document size mixed loading is prohibited) are set in the document size mixed mode according to the present exemplary Embodiment. For example, a combination of document sizes which are different in document widths such as A3 and B4 can be mixed and loaded. Combinations of documents that can be mixed include, for example, combinations of A3 and B4, A3 and B5, B4 and A4, A4 and B5, A4R and B5, B4 and A4R, B4 and A5, B5 and A5, ledger and legal, ledger and folio, and ledger and half letter. Ledger, legal, folio, and half letter respectively represent sheet sizes of 11×17 inches, 8.5×14 inches, 8.5×13 inches, and 5.5×8.5 inches.

On the other hand, combinations of document sizes with the same document width such as the above-described A3 and A4, A4 and A5, and B4 and B5 cannot be mixed and loaded.

Depending on the configuration of the ADF (e.g., a large-size ADF), detection of the document length can be completed before the document reaches the reading start position in some cases. In a case where such an ADF is used, combinations of all of readable document sizes may be regarded as the combinations of document sizes that can be mixed and loaded.

The display unit (not illustrated) in the operation unit 115 of the MFP 101 can display a preview screen of an image corresponding to the read document. The preview screen is described in detail below.

FIGS. 2A and 2B illustrate examples of preview screens displayed on the operation unit 115 of the MFP 101.

In FIGS. 2A and 2B, preview screen portions 201, 205, 210, and 212 are areas for displaying preview screens. A preview operation is to display image data obtained by reading a document (image corresponding to the document) for confirming the image data before output (e.g., print, storage, and transmission). Display of the preview screen portions illustrated in FIGS. 2A and 2B is shifted in order of the preview screen portions 201, 205, 210, and 212. The preview screen portions are described below in sequence.

The preview screen portion 201 represents a preview screen in a case where a preview is performed at a time when reading of a first sheet of documents is completed by setting the documents including a plurality of sheets having different document widths (e.g., A3 and B4 mixed size documents) on the ADF 100 that is not in the document size mixed mode.

A preview image 202 is a preview image of the first sheet of the document.

Size display 203 indicates size information of the read image data.

In a case where the ADF 100 is not in the document size mixed mode, size detection (above-described "document size detection on the document tray") is performed once by regarding a plurality of sheets of documents placed on the document tray 30 of the ADF 100 as one set. Accordingly, a size to be detected corresponds to a size of the document having a maximum width or a maximum length.

On the other hand, in a case where the ADF 100 is in the document size mixed mode, size detection (above-described "document size detection in the document size mixed mode") is performed each time a sheet in the plurality of sheets of the documents placed on the document tray 30 of the ADF 100 is read. Thus, a size of each read document different in size can be detected. In the document size mixed mode, size detection is performed each time a sheet is read, and an image corresponding to the detected size is generated, so that a reading speed is slower than that in a case where the ADF 100 is not in the document size mixed mode. A reading speed is prioritized in a default operation of a scanner, and thus the scanner is commonly not in the document size mixed mode.

In the preview screen portion 201, information about size detection ("A3" in this example) performed regarding a plurality of sheets of the documents (document bundle S) placed on the document tray 30 of the ADF 100 as one set is displayed as the size display 203 since the ADF 100 is not in the document size mixed mode.

Page display 204 is information indicating a number of a page in which the image data is located in a total number of the read documents. The preview screen portion 201 displays "1/1" since the preview display is the one at the time when reading of the first sheet of documents is completed.

The preview screen portion 205 represents the preview screen at the time when reading of the second sheet of the documents is completed.

A preview image 206 is a preview image of the second sheet of the documents. The preview image 206 represents a state in which the second sheet of the documents actually has a "B4" size but is detected as A3 by "document size detection on the document tray", and thus the preview screen is displayed as an "A3" image.

Information 207 notifies a user that there is a possibility that the documents having different sizes are mixed and read, and the second sheet of the documents is read as "A3", but a size of an original document is likely to be different.

An operation key 208 is used for continuing reading of the document. If the operation key 208 is pressed in the state exemplified in the preview screen portion 205, reading of a next document is started while maintaining the image data of the preview image 206 as "A3".

An operation key 209 is used for changing the mode to "the document size mixed mode" and re-reading the document.

An operation key 214 is used for performing trimming processing on the image data on the preview screen. A user can correct (edit) the read image data to the size of the original document by the trimming processing without performing re-reading.

The preview screen portion 210 represents the preview screen immediately after pressing the operation key 209.

Information 211 notifies the user of replacement of the document on the ADF 100 for re-reading in "the document size mixed mode". In re-reading in a case where all pages of the documents are replaced on the ADF 100, all pages may be re-read in the document size mixed mode, and a target page or subsequent pages may be re-read in the document size mixed mode after skipping to the target page. In addition, the target page and the subsequent pages may be re-read in the document size mixed mode after placing the target page and the subsequent pages of the documents on the ADF 100.

If an operation key 215 is pressed in the state exemplified in the preview screen portion 210, re-reading in the document size mixed mode is performed, the size detection is performed for each sheet of the documents, and the second sheet of the documents is read as a "B4" sheet.

The preview screen portion 212 represents the preview screen at the time when the above-described operation key 215 is pressed, and re-reading of the second sheet of the documents in "the document size mixed mode" is completed. A preview image 213 represents a state in which the preview screen is displayed as a B4 image that has the same size as the actual size of the second sheet of the documents. In a case where documents having different sizes are included, the above-described "document size detection in the document size mixed mode" is performed, and reading and preview display are performed in appropriate sizes since the mode is changed to the document size mixed mode. As described above, in a case where a read size is different from a document size, the MFP 101 can provide navigation for prompting a user to re-read the document by enabling the document size mixed mode (function of distinguishing mixed size documents including documents having different sizes and performing reading corresponding to the respective sizes of the documents).

If the operation key 208 is pressed in the above-described preview screen portion 205, the above-described "navigation for re-reading in the document size mixed mode" is skipped, and reading of a next document is started while maintaining the size as it is.

Operations relating to the preview display by the MFP 101 are described below with reference to FIG. 3. The operations regarding the preview display are executed when a job for reading a document and performing output based on the read image such as a copy job (reading and printing the document), a storage job (reading and storing the document), and a transmission job (reading and transmitting the document) is executed.

Figure 3:
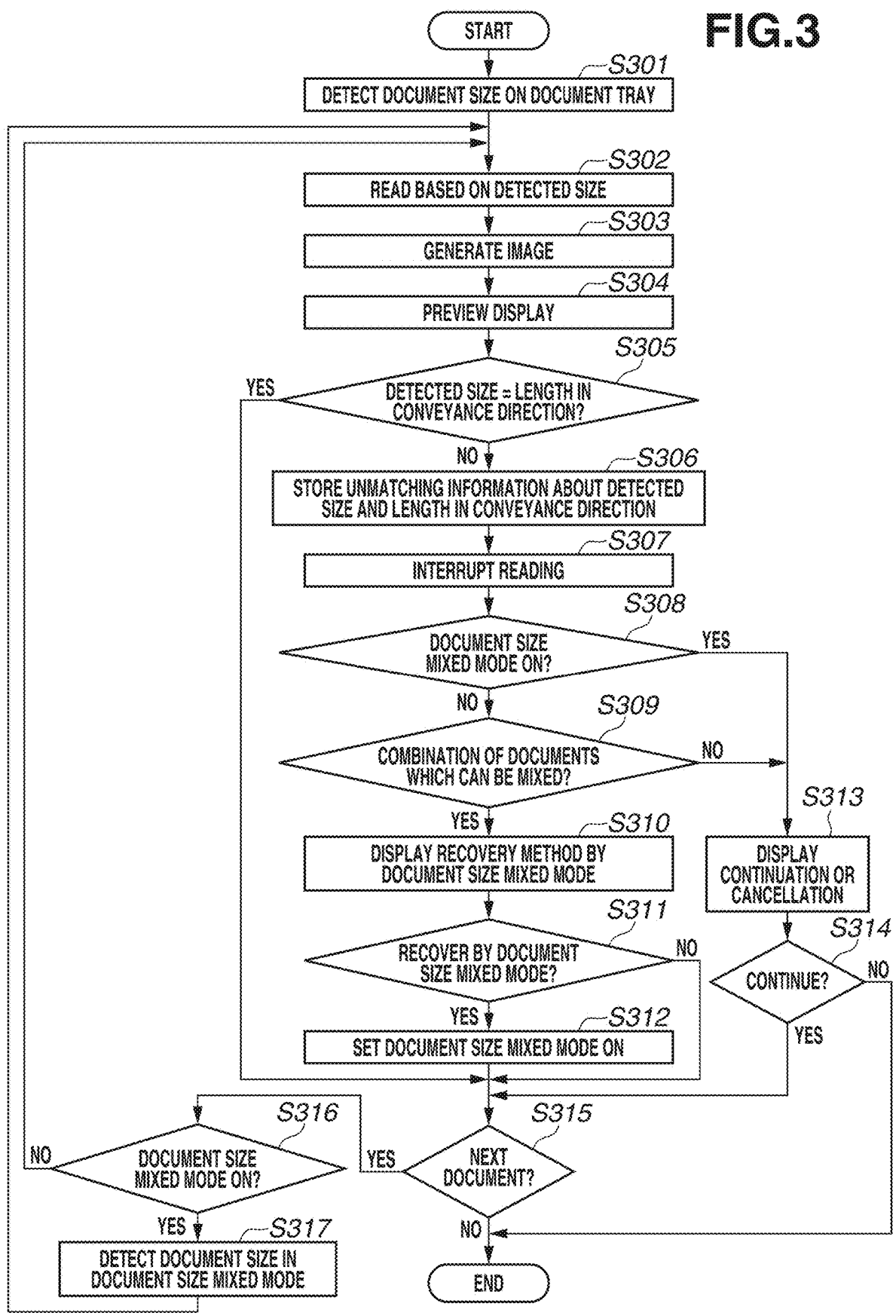
FIG. 3 is a flowchart illustrating operation of preview display.

FIG. 3 is a flowchart illustrating the operations regarding the preview display by the MFP 101. Each operation (step) illustrated in the flowchart in FIG. 3 is implemented by the CPU 111 of the MFP 101 reading a control program stored in the ROM 112 or the storage 114 to the RAM 113 and executing the control program.

In step S301, the CPU 111 performs the above-described "document size detection on the document tray" to detect a size regarding a plurality of documents set on the document tray 30 of the ADF 100 in the scanner 117 as one set and stores "a detected size" in the RAM 113. In a case where a reading instruction by pressing of a start key (not illustrated) provided on the operation unit 115 is received, the CPU 111 advances the processing to step S302.

In step S302, the CPU 111 starts reading the document using the ADF 100 in the scanner 117 based on "the detected size". In other words, the CPU 111 reads the document in "the detected size".

Next, in step S303, the CPU 111 generates image data based on reading processing performed in the above-described step S302. At that time, the CPU 111 also generates image data of a thumbnail image. The image data generated in step S303 are accumulated in the storage 114.

Next, in step S304, the CPU 111 displays a preview screen of the image data generated in the above-described step S303 on the display unit (not illustrated) in the operation unit 115.

Next, in step S305, the CPU 111 determines whether "the detected size" coincides with "a length in the conveyance direction". "The length in the conveyance direction" is measured by the CPU 111 based on a detection result by the sheet sensor 12 during conveyance of the document by the ADF 100 in the reading processing in the above-described step S302 and is determined by being compared with a length in the document conveyance direction of "the detected size". The CPU 111 performs control described below based on a determination result.

In a case where it is determined that "the detected size" coincides with "the length in the conveyance direction" (YES in step S305), the CPU 111 determines that the size of the read document coincides with "the detected size" and advances the processing to step S315. For example, in the state exemplified in the preview screen portion 201 in FIG. 2A, it is determined as "YES" in the above-described step S305.

On the other hand, in a case where it is determined that the above-described "detected size" does not coincide with "the length in the conveyance direction" (NO in step S305), the CPU 111 determines that the size of the read document is different from "the detected size", i.e., the sizes of the documents on the document tray 30 are different from each other. In this case, the CPU 111 advances the processing to step S306. For example, in the state exemplified in the preview screen portion 205 in FIG. 2A, it is determined as "NO" in the above-described step S305.

In step S306, the CPU 111 stores information indicating size unmatching (the read size does not coincide with the document size) in association with target image data determined that the sizes do not coincide with each other (NO) in the above-described step S305 in the storage 114. This is because the size unmatching information is to be displayed together when a thumbnail list described below is displayed.

Next, in step S307, the CPU 111 interrupts reading.

Next, in step S308, the CPU 111 determines whether "the document size mixed mode" is ON. Information indicating whether "the document size mixed mode" is ON or OFF is stored in, for example, the RAM 113.

In the above-described step S308, in a case where it is determined that the document size mixed mode is ON (ADF 100 is in the document size mixed mode) (YES in step S308), the CPU 111 advances the processing to step S313. This case corresponds to a case in which reading is performed in the document size mixed mode, but size detection cannot be appropriately performed. Therefore, in step S313, the CPU 111 prompts a user to instruct continuation or cancellation. Processing in step S313 and subsequent steps are described below.

On the other hand, in the above-described step S308, in a case where it is determined that the document size mixed mode is OFF (ADF 100 is not in the document size mixed mode) (NO in step S308), the CPU 111 advances the processing to step S309.

In step S309, the CPU 111 determines whether a combination of documents can be read in "the document size mixed mode" (combination of mixable documents). As described above, there is a combination of documents which cannot be read in the document size mixed mode due to a limitation of the scanner 117 according to the present exemplary embodiment. For example, a combination of A3 and B4 documents can be read in "the document size mixed mode", but a combination of A3 and A4 documents cannot be read in "the document size mixed mode". The CPU 111 specifies the document size of the conveyed document based on "the length in the conveyance direction" used in the above-described step S305 and determines whether a combination of the document size and the detected size is the combination of mixable documents.

In the above-described step S309, in a case where it is determined not to be the combination of mixable documents (NO in step S309), the CPU 111 advances the processing to step S313.

In step S313, the CPU 111 displays a screen including options for confirming whether to "continue" or "cancel" reading on the operation unit 115 and receives an instruction from the user.

In step S314, the CPU 111 determines whether the instruction to "continue" is received. In a case where it is determined that the instruction to "continue" is received (YES in step S314), the CPU 111 advances the processing to step S315.

On the other hand, in step S314, in a case where it is determined that the instruction to "cancel" is received (NO in step S314), the CPU 111 terminates the processing in the present flowchart.

In the above-described step S309, in a case where it is determined to be the combination of mixable documents (YES in step S309), the CPU 111 advances the processing to step S310.

In step S310, the CPU 111 displays information for prompting re-reading in the document size mixed mode as exemplified in the pieces of the information 207 to 209, 214 and the like in FIG. 2A in the operation unit 115 and receives an instruction from the user. In this regard, the option of "continue" exemplified as the operation key 208 and the option of "perform trimming" exemplified as the operation key 214 in FIG. 2A are displayed.

Next, in step S311, the CPU 111 determines whether re-reading in the document size mixed mode is instructed. In a case where it is determined that re-reading in the document size mixed mode is instructed (YES in step S311), the CPU 111 advances the processing to step S312.

In step S312, the CPU 111 sets the document size mixed mode "ON" and advances the processing to step S315.

On the other hand, in the above-described step S311, in a case where it is determined that re-reading in the document size mixed mode is not instructed (NO in step S311), the CPU 111 advances the processing to step S315. For example, in a case where the instruction to "continue" is received (NO in step S311), the CPU 111 directly advances the processing to step S315. Once the instruction to "continue" is received, the CPU 111 may skip reception of "an operation for instructing re-reading of the document by enabling the document size mixed mode" every time the document is read thereafter. In this case, the CPU 111 may perform notification of mixed size documents and enable reception of "the operation for instructing re-reading of the document by enabling the document size mixed mode" after reading all of the documents on the document tray 30. In addition, in a case where an instruction to "perform trimming" is received, the CPU 111 advances the processing to step S315 after image editing processing by trimming.

In step S315, the CPU 111 determines whether there is a next document to be read on the ADF 100 in the scanner 117. In a case where it is determined that there is no next document to be read (NO in step S315), the CPU 111 terminates the processing in the present flowchart.

On the other hand, in the above-described step S315, in a case where it is determined that there is a next document to be read (YES in step S315), the CPU 111 advances the processing to step S316.

In step S316, the CPU 111 determines whether "the document size mixed mode" is "ON". In a case where it is determined that the document size mixed mode is "OFF" (NO in step S316), the CPU 111 directly returns the processing to step S302.

On the other hand, in step S316, in a case where it is determined that "the document size mixed mode" is "ON" (YES in step S316), the CPU 111 advances the processing to step S317.

In step S317, the CPU 111 performs the above-described "document size detection in the document size mixed mode" to detect the size of the document to be conveyed for each sheet of the documents, defines the detected document size as "the detected size", and returns the processing to step S302. In the example in which the operation key 215 is pressed on the preview screen portion 210 in FIG. 2B, the document is set again on the ADF 100, so that it is determined that there is a next document in the above-described step S315, and reading of the document is repeated again from the first sheet. In this case, it is determined that the document size mixed mode is ON in the above-described step S316 each time the document is read, and thus "document size detection in the document size mixed mode" is performed. Accordingly, the document size is detected for each sheet of the documents, and the second sheet of the documents can be read as the appropriate size as exemplified in the preview screen portion 212 in FIG. 2B. As described above, in a case where reading is performed in the size different from the size of the document, information regarding the information and a recovery method are displayed on the screen together with a preview image. In this way, a user can easily recognize the fact that the document is read in the different size, and even a user who does not know a recovery measure can easily perform the recovery measure.

Figure 4:
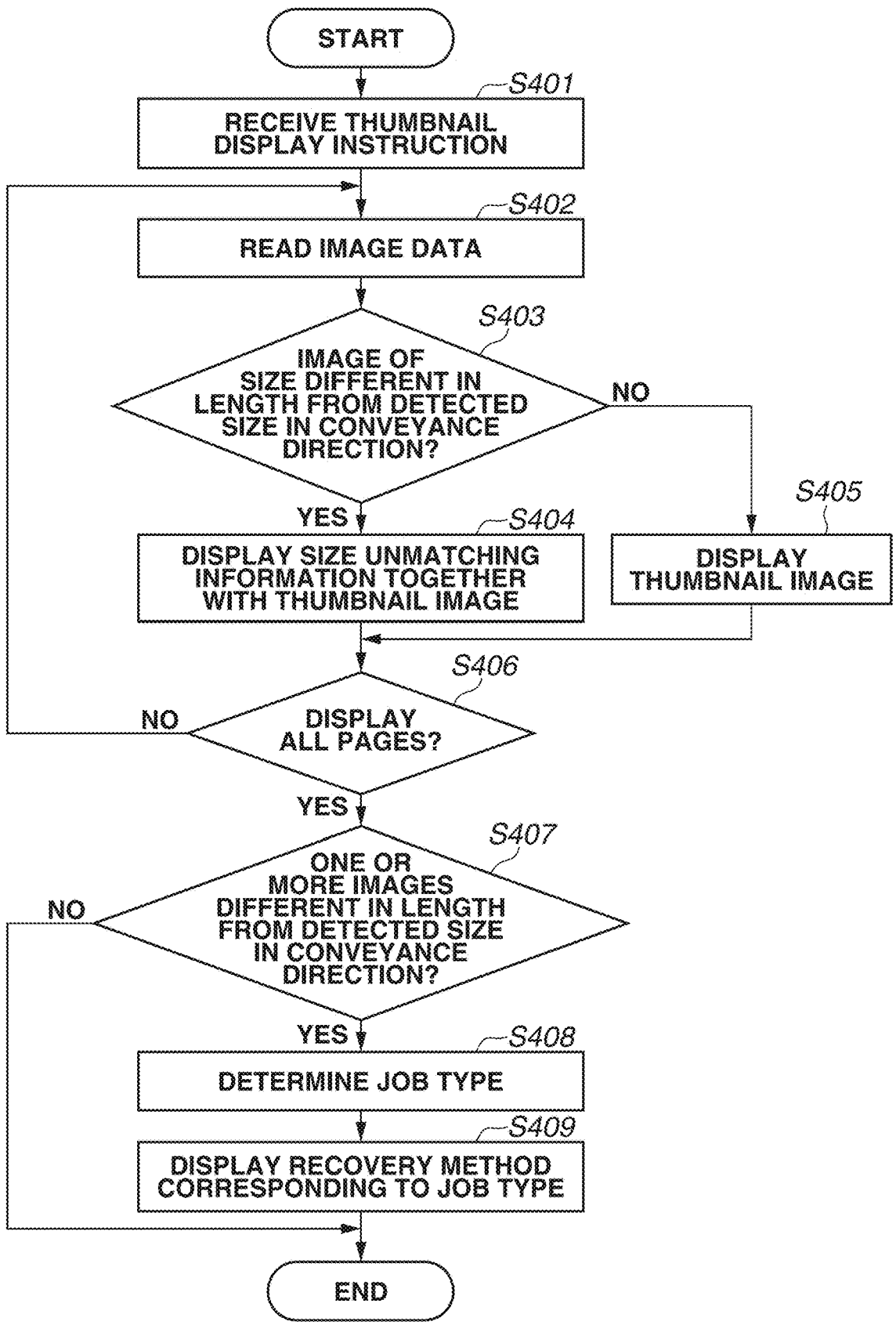
FIG. 4 is a flowchart illustrating operation of thumbnail display.

FIG. 4 is a flowchart illustrating operations regarding thumbnail display by the MFP 101. Each operation (step) illustrated in the flowchart in FIG. 4 is implemented by the CPU 111 of the MFP 101 reading a control program stored in the ROM 112 or the storage 114 to the RAM 113 and executing the control program.

In step S401, if a thumbnail display instruction is received from the operation unit 115, the CPU 111 advances the processing to step S402. It is not illustrated in FIG. 4, but the CPU 111 successively conveys the document from the document bundle S on the document tray 30 to read a document using the ADF 100, and accumulates the read image data (including thumbnail image data) in the storage 114 in parallel with the processing in step S401. For example, the CPU 111 performs processing, for example, performed in steps S301 to S303, S305, S306, and S315 to S302 in FIG. 3. The CPU 111 may advance the processing to step S402 in parallel with the document reading processing and may advance the processing to step S402 after the document reading processing is completed and the image data of all of the documents are accumulated in the storage 114.

In step S402, the CPU 111 reads the image data accumulated in the storage 114 (thumbnail image data accumulated in step S303 in FIG. 3).

Next, in step S403, the CPU 111 determines whether the size unmatching information stored in step S306 in FIG. 3 is present with respect to the image data read in the above-described step S402.

In the above-described step S403, in a case where it is determined that the size unmatching information is present (YES in step S403), the CPU 111 advances the processing to step S404.

In step S404, the CPU 111 displays information indicating the size unmatching information (e.g., an icon 502 in FIG. 5 described below) together with the thumbnail image and advances the processing to step S406.

On the other hand, in the above-described step S403, in a case where it is determined that the size unmatching information is not present with respect to the image data read in the above-described step S402 (NO in step S403), the CPU 111 advances the processing to step S405. In step S405, the CPU 111 displays the thumbnail image (size unmatching information is not displayed) and advances the processing to step S406.

In step S406, the CPU 111 determines whether thumbnails are displayed for all pages.

In a case where it is determined that the thumbnails are not stored for all pages (NO in step S406), the CPU 111 returns the processing to step S402.

On the other hand, in the above-described step S406, in a case where it is determined that the thumbnails are stored for all pages (YES in step S406), the CPU 111 advances the processing to step S407.

In step S407, the CPU 111 determines whether there is image data causing size unmatching. In a case where it is determined that there is no image data causing size unmatching (NO in step S407), the CPU 111 terminates the processing in the present flowchart.

On the other hand, in the above-described step S407, in a case where it is determined that there is image data causing size unmatching (YES in step S407), the CPU 111 advances the processing to step S408.

In step S408, the CPU 111 determines a job type. The job type includes "print", "storage", and "transmission" as representative ones.

Next, in step S409, the CPU 111 displays a recovery method corresponding to the job type on the operation unit 115. The recovery method corresponding to the job type is described below.

The CPU 111 terminates the processing in the present flowchart after the processing in step S409, receives a user instruction from the operation unit 115, and executes processing corresponding to the user instruction.

Figure 5:
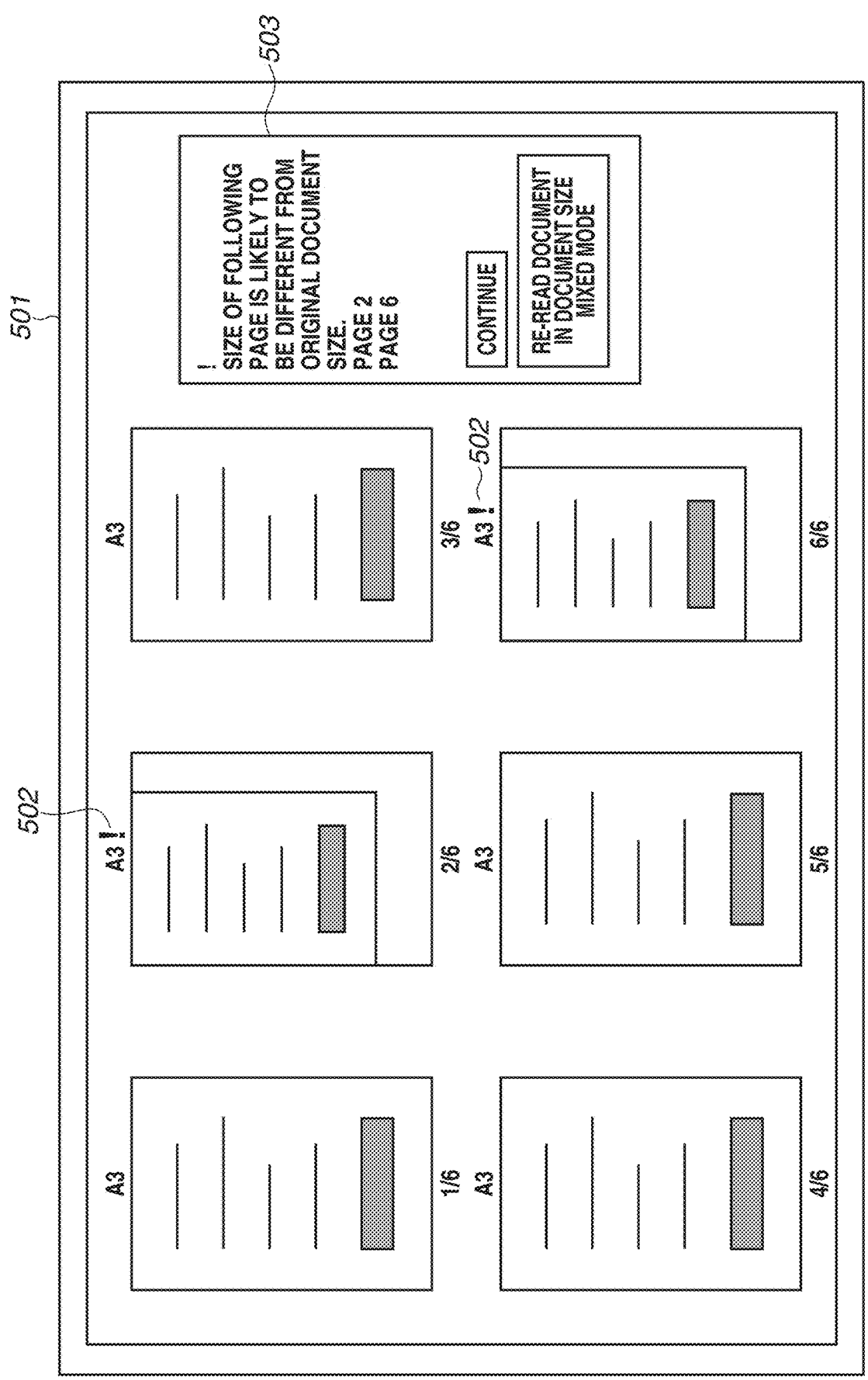
FIG. 5 illustrates an example of a screen for displaying unmatching information in thumbnail display.

FIG. 5 illustrates an example of a screen for displaying unmatching information in the thumbnail display displayed on the operation unit 115 of the MFP 101.

A thumbnail screen portion 501 is an area for displaying a thumbnail.

The icon 502 indicates that the image data does not coincide with the size of the original document. The icon 502 is displayed by the processing in step S404 in the above-described FIG. 4.

Information 503 indicates which image on thumbnail display does not coincide with the size of the original document and prompts re-reading in the document size mixed mode as the recovery method. The information 503 is displayed by the processing in step S409 in the above-described FIG. 4. The information 503 is described in detail below.

For example, in a case where the job type is "print", and "two-sided printing" is set, in a situation exemplified in the thumbnail screen portion 501 in FIG. 5, all pages are printed on A3 size sheets. In this situation, it is not desirable to present only re-reading in the document size mixed mode as the recovery method as indicated in the information 503. The recovery method corresponding to a content of the job type is used such as to prompt re-reading in the document size mixed mode after releasing the setting of "two-sided printing" or to prompt re-reading in the document size mixed mode after replacing pages.

In a case where the job type is "storage" and "transmission", it is desirable to present, for example, only re-reading in the document size mixed mode as the recovery method.

As described above, the recovery method to be presented is appropriately switched according to which image causes size unmatching in a case where a thumbnail list is displayed and a type of a job to be performed on the image data. In this way, a user can easily recognize presence of an image which is read in a different size in documents after reading of all documents are completed. In addition, a more appropriate recovery method corresponding to the job type can be adopted.

The thumbnail display in FIG. 4 may be executed after the preview display in FIG. 3.

Figure 6:
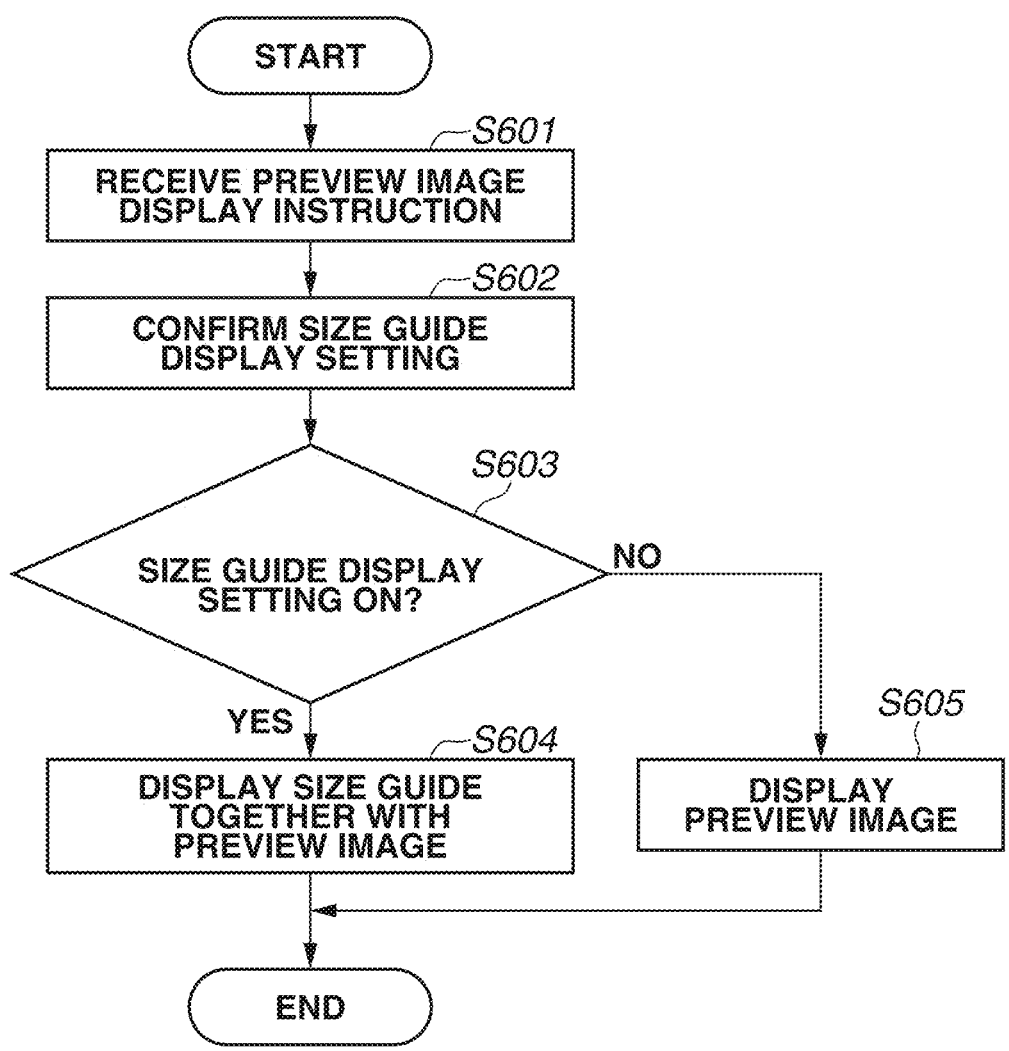
FIG. 6 is a flowchart illustrating operation of a preview display step.

FIG. 6 is a flowchart illustrating operations regarding a preview display step by the MFP 101. Each operation (step) illustrated in the flowchart in FIG. 6 is realized by the CPU 111 of the MFP 101 reading a control program stored in the ROM 112 or the storage 114 to the RAM 113 and executing the control program.

In step S601, in a case where a preview image display instruction is received, the CPU 111 advances the processing to step S602. The preview image display instruction is, for example, an instruction of the preview display in step S304 in FIG. 3.

In step S602, the CPU 111 confirms a size guide display setting. The size guide display is to display information indicating the detected size and the original document size as "a size guide" by overlaying on a preview image in a case where size unmatching occurs as, for example, a preview screen portion 703 in FIG. 7. The original document size is estimated from "the length of the document detected in the conveyance path in the scanner 117", which is used in the determination in step S305 in FIG. 3. The size estimated here is, for example, a regular size, but may include a user setting size. The size guide display setting is made by a user and the like and stored in the storage 114.

Next, in step S603, the CPU 111 determines whether the size guide display setting is present (ON). In a case where it is determined that the size guide display setting is present (YES in step S603), the CPU 111 advances the processing to step S604.

In step S604, the CPU 111 displays a size guide 706 together with a preview image as illustrated in the preview screen portion 703 in FIG. 7 and terminates the processing in the present flowchart.

On the other hand, in the above-described step S603, in a case where it is determined that the size guide display setting is not present (OFF) (NO in step S603), the CPU 111 advances the processing to step S605.

In step S605, the CPU 111 displays a preview image 702 (size guide is not displayed) as illustrated in a preview screen portion 701 in FIG. 7 and terminates the processing in the present flowchart.

FIG. 7 illustrates an example of the size guide display according to the present exemplary embodiment.

In FIG. 7, the preview screen portion 701 is an example of a screen displayed in a case where the size guide display setting is not present (OFF).

The preview image 702 is an example of an image displayed in a case where, for example, an original document has a B4 size, but the size is detected as A3. In the preview image 702, it is difficult for a user to understand how size unmatching occurs.

The preview screen portion 703 is an example of a screen displayed in a case where the size guide display setting is present (ON).

In a preview image 704, a line 705 indicating the A3 size as the size obtained by the size detection and a line 706 indicating the B4 size as the size estimated from "the length of the document detected in the conveyance path in the scanner 117" are displayed as a size guide by overlaying on the preview image 704. Accordingly, a user can easily recognize how the size unmatching occurs in the preview image 704. The user can perform trimming processing by operating the operation key 214 for "perform trimming" in FIG. 2A using the size guide 706. At that time, the user can perform trimming on the read image data to a desired size as displayed in the size guide 706 or by performing an operation for widening or narrowing the size guide 706.

Figure 8:
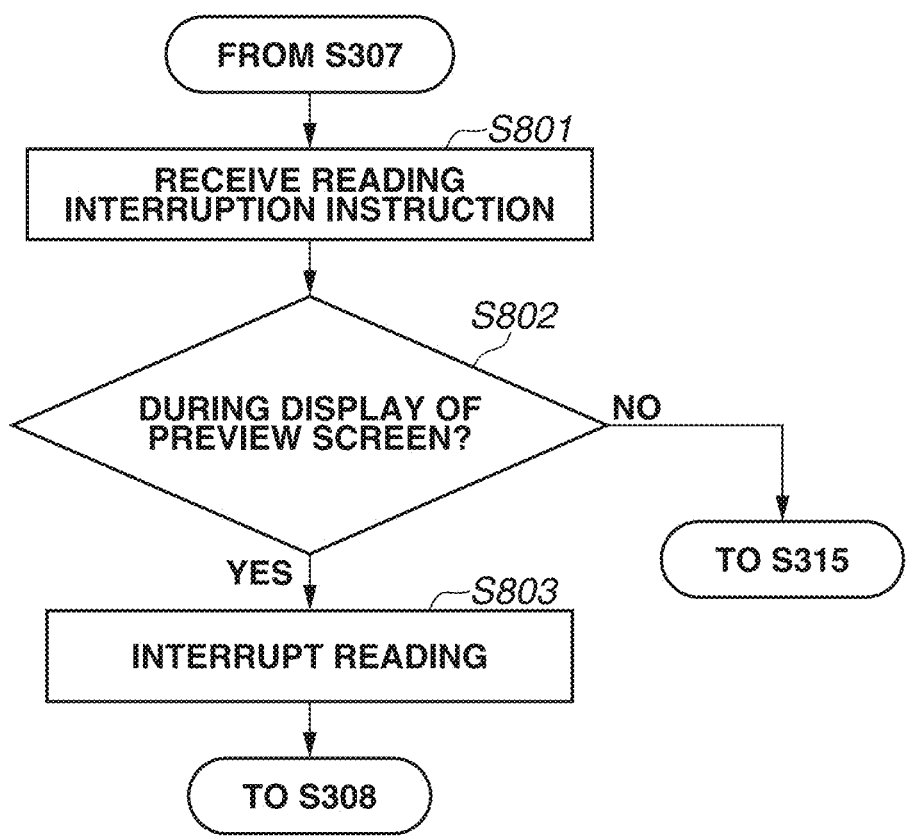
FIG. 8 is a flowchart illustrating operation of a reading interruption step in detail.

FIG. 8 is a flowchart illustrating detailed operations regarding a reading interruption step in step S307 in FIG. 3. Each operation (step) illustrated in the flowchart in FIG. 8 is implemented by the CPU 111 of the MFP 101 reading a control program stored in the ROM 112 or the storage 114 to the RAM 113 and executing the control program.

The processing in the present flowchart is started with the start of the processing in step S307 in FIG. 3.

In step S801, the CPU 111 receives a reading interruption instruction.

Next, in step S802, the CPU 111 determines whether the preview screen (preview screen portions 201, 205, 210, and 212 illustrated in FIGS. 2A and 2B and the like) is being displayed. The preview screen displayed on the operation unit 115 can be closed by a user operation from the operation unit 115. For example, a user can close the preview screen when it is determined that confirmation of a preview image is not appropriate.

In the above-described step S802, in a case where it is determined that the preview screen is being displayed (YES in step S802), the CPU 111 advances the processing to step S803.

In step S803, the CPU 111 interrupts reading of the document and advances the processing to step S308 in FIG. 3.

On the other hand, in the above-described step S802, in a case where it is determined that the preview screen is not being displayed (closed) (NO in step S802), the CPU 111 advances the processing to step S315 in FIG. 3 and continues the reading processing by the scanner 117 without interrupting reading.

In a case where the preview screen is closed, this fact indicates that the user does not confirm the preview image, and it can be considered that the user is not near the MFP 101. Therefore, in a case where the preview screen is closed, the CPU 111 performs control to continue the reading processing by the scanner 117 without interrupting reading. It is not illustrated, but the CPU 111 skips "preview display" in step S304 in FIG. 3 in a case where the preview screen is closed.

As described above, the present exemplary embodiment enables a user to easily recognize that documents having different sizes are mixed and read, and a part of image data has a size different from the document size. Further, the present exemplary embodiment can guide a user who does not know the document size mixed mode as the recovery method to perform re-reading of the document by switching to the document size mixed mode. In other words, a user who does not know the document size mixed mode as the recovery method can understand that the user only has to perform re-reading of the document by switching to the document size mixed mode.

In a case where it is determined that there is a possibility that documents having different sizes are mixed and read, the MFP 101 may notify a user of the fact by displaying information like the information 207 in FIG. 2A, shift to the document size mixed mode without displaying the operation key 208 in FIG. 2A, shift to the preview screen 210 in FIG. 2B, and execute re-reading of the document.

Conventionally, in a case where a document in mixed size documents is read in a size different from a document size by the scanner, it is difficult for a user to notice size unmatching only from a preview image and to understand a recovery method for the size unmatching. In contrast, according to the present exemplary embodiment, the MFP 101 displays, together with a preview image, a situation in which size unmatching occurs and the recovery method for the size unmatching, and thus can notify a user of the occurrence of the size unmatching in an easily understandable manner and navigate the user to the recovery method in an easily understandable manner. In this way, a user who does not know presence of the document size mixed mode and a user who does not know how to use the document size mixed mode can perform re-reading of the document using the document size mixed mode.

Configurations and contents of the above-described various data are not limited to the above-described ones and may be configured in various ways according to applications and purposes.

Various exemplary embodiments are described above, but embodiments can be implemented in various forms such as a system, an apparatus, a method, a program, and a storage medium. Specifically, the present disclosure can be applied to a system configured with a plurality of devices, or can be applied to an apparatus configured with a single device.

In addition, combinations of the above-described exemplary embodiments are all included as embodiments.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-162254, filed Aug. 31, 2018, which is hereby incorporated by reference herein in its entirety.

What is claimed is:

1. An image reading apparatus comprising:
a display;
at least one memory storing instructions; and
at least one processor executing the instructions causing the image reading apparatus to:
detect a size used for control to read a plurality of documents stacked on a document stacking tray before conveyance of the stacked document;
receive a reading instruction based on an operation on a start key;
according to the reading instruction, successively convey the plurality of documents stacked on the document stacking tray and read the documents;
determine, in response to at least one of the plurality of documents being read, whether there is a difference from the detected size among respective sizes of the plurality of read documents;
in a case where it is determined that there is the difference and a function of performing reading corresponding to respective size of the plurality of documents is disabled when the reading instruction has been received, in a preview screen displayed on the display, notify a user of a possibility that documents having different sizes are mixed and read, and
provide navigation for prompting enabling the function and then re-reading of the plurality of documents.

2. The image reading apparatus according to claim 1, wherein the instructions cause the image reading apparatus to:
detect a length in a conveyance direction of each of the plurality of documents in a conveyance path of the document; and
wherein the difference from the detected size is determined according to the length in the conveyance direction of each of the plurality of documents.

3. The image reading apparatus according to claim 1, wherein the navigation includes an option for skipping an operation for enabling the function and instructing re-reading of the document at a timing at which the navigation is provided, and enabling the function to perform re-reading of the document after all of the plurality of documents are read.

4. The image reading apparatus according to claim 1, wherein the navigation is provided only in a case where the plurality of documents includes a combination of document sizes readable by using the function.

5. The image reading apparatus according to claim 4, wherein the combination is a combination of document sizes in which a size in a direction perpendicular to a conveyance direction of the document are different.

6. The image reading apparatus according to claim 4, wherein the combination includes at least any of a combination of A3 and B4, a combination of A3 and B5, a combination of B4 and A4, a combination of A4 and B5, a combination of A4R and B5, a combination of B4 and A4R, a combination of B4 and A5, a combination of B5 and A5, a combination of ledger and legal, a combination of ledger and folio, and a combination of ledger and half letter.

7. The image reading apparatus according to claim 1, wherein the navigation provides a different content according to a type of a job including reading of the document.

8. The image reading apparatus according to claim 1, wherein the preview screen is displayed including a size guide of a regular size corresponding to a size of the read document or a size guide of a user setting size in an overlapping manner on the image corresponding to the read document.

9. The image reading apparatus according to claim 8, wherein an image corresponding to the read document is editable using the size guide.

10. A method for an image reading apparatus including a display, the method comprising:
detecting a size used for control to read a plurality of documents stacked on a document stacking tray before conveyance of the stacked document;
receiving a reading instruction based on an operation on a start key;
according to the reading instruction, successively conveying the plurality of documents stacked on the document stacking tray and reading the documents;

determining, in response to at least one of the plurality of documents being read, whether there is a difference from the detected size among respective sizes of the plurality of read documents;

notifying, in a case where it is determined that there is the difference and a function of performing reading corresponding to respective size of the plurality of documents is disabled when the reading instruction has been received, in a preview screen displayed on the display, notify a user of a possibility that documents having different sizes are mixed and read, in a preview screen displayed on the display, a user of a possibility that documents having different sizes are mixed and read, and providing navigation for prompting enabling the function and then re-reading of the plurality of documents.

11. A non-transitory computer readable storage medium on which is stored a computer program for causing a computer to execute a method for an image reading apparatus including a display, the method comprising:

detecting a size used for control to read a plurality of documents stacked on a document stacking tray before conveyance of the stacked document;

receiving a reading instruction based on an operation on a start key;

according to the reading instruction, successively conveying the plurality of documents stacked on the document stacking tray and reading the documents;

determining, in response to at least one of the plurality of documents being read, whether there is a difference from the detected size among respective sizes of the plurality of read documents;

notifying, in a case where it is determined that there is the difference and a function of performing reading corresponding to respective size of the plurality of documents is disabled when the reading instruction has been received, in a preview screen displayed on the display, notify a user of a possibility that documents having different sizes are mixed and read, in a preview screen displayed on the display, a user of a possibility that documents having different sizes are mixed and read, and providing navigation for prompting enabling the function and then re-reading of the plurality of documents.

* * * * *